April 5, 1949.　　M. KATCHER ET AL　　2,466,111
PRESSURE OPERATED SWITCH FOR HYDRAULIC BRAKE SYSTEMS
Filed Aug. 7, 1946

INVENTORS
MORRIS KATCHER
CLYDE R. MAYO
BY
Emanuel Scheyer
ATTORNEY

Patented Apr. 5, 1949

2,466,111

UNITED STATES PATENT OFFICE 2,466,111

PRESSURE OPERATED SWITCH FOR HYDRAULIC BRAKE SYSTEMS

Morris Katcher, New York, N. Y., and Clyde R. Mayo, Fairfield, Ill.; said Mayo assignor to said Katcher Application August 7, 1946, Serial No. 690,860

11 Claims. (Cl. 200—83)

This invention relates generally to pressure operated switches, and more particularly to switches of this character adapted to be operated by pressure changes in the fluid pressure of hydraulic brake systems of motor vehicles.

The invention is useful with a hydraulic brake system for operating a stop light when the brakes are applied, and when there is loss of pressure in the system beyond a predetermined minimum, for operating a warning signal.

It is usual in motor vehicles to operate a stop light when the brakes are applied, but of course it will be understood by those skilled in the art, that other types of signal can be operated and accordingly the term stop light as used herein is intended to have this broader meaning.

It is essential for the safe operation of the brake system that the pressure in it be above a predetermined minimum. A positive pressure must be maintained, which while only small, say three or four pounds per square inch, is sufficient to keep air out of the system. Further, the advantage of maintaining a positive pressure is that should there be a leakage of brake fluid, such pressure would be lost. The loss in pressure operates the switch or other means which in turn effects the operation of a visual or audible alarm.

It is an object of the present invention to use the same pressure unit which operates the alarm when the pressure falls too low, to operate the stop light with the high pressure developed in the hydraulic brake system when the brakes are applied. Electric circuits are controlled so that the alarm is actuated when the pressure in the system falls below a predetermined amount, and the stop light goes on when the pressure in the system exceeds a predetermined amount.

Because the switch must be very delicate and sensitive to register a drop in pressure of only a few pounds, it must have special protection when the brakes are jammed on and the pressure rises to several hundred pounds per square inch. This protection is provided by means of a sturdy stop against which part of the movable contact cylinder abuts when the pressure exceeds a predetermined amount, the abutting taking place during the closing of the circuit through the stop light terminal of the switch. This and certain other features are described in Katcher's copending application Serial No. 516,920, filed Jan. 4, 1944, and which has resulted in Patent No. 2,430,428, dated Nov. 4, 1947. The present invention is an improvement over that described in the copending application, in that the latter depends upon one spring to control both the stop light action and the warning signal action. This makes the prior switch very critical because the stop light action is relatively coarse, that is it takes place at relatively high pressure, while the warning action has to be highly sensitive to act on the low pressure required for the warning signal control. In the invention shown in the present application, two independent springs are provided, a coarse or heavy one for the stop light action and a delicate one for the warning signal action.

Other objects and advantages will become apparent upon further study of the description and drawing, in which.

Figure 5:
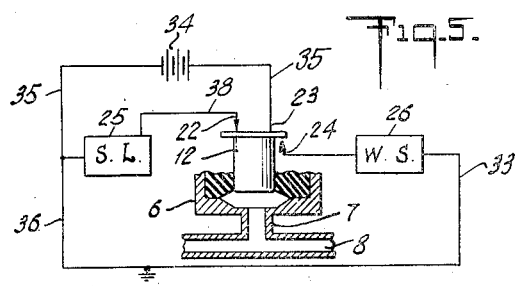
Fig. 5 is a wiring diagram showing the hookup of the switch in a hydraulic brake system for operating both a stop light and a warning signal. The connection for the transmission of fluid pressure to the switch from the main distributing tube of the hydraulic system is shown, a fragment only of the tube and switch being shown.

Casing 6 is in the form of a hollow hexagonal nut with a hollow externally threaded boss or inlet 7, the latter being adapted to be attached to the main distributing tube 8 of the hydraulic brake system, as shown diagrammatically in Fig. 5. When the switch is so attached, flexible diaphragm 9 responds to the pressure in the system. Inside of casing 6 is an insulating cylinder 10 which fits snugly against the cylindrical inner surface of said casing. The lower end of cylinder 10 is recessed to contain washer 11 which bears on the rim of diaphragm 9. The central portion of cylinder 10 is provided with a cylindrical bore in which is slidably mounted hollow metallic movable contact cylinder or sleeve 12 having a closed bottom wall 32 and a radially extending flange 13 at its upper end. The upper portion of cylinder 10 is counter bored to provide an upstanding annular flange 14 and a circular recess 15 with a radially extending portion 16, Figs.

1 and 4, which provides space in which fixed contact 17 nests. Set inside casing 6 on flange 14 is cylindrical insulating block 18 which is firmly pressed down on cylinder 10 by swedged over edges 19 of casing 6. Cylinder 10 in turn bears down on washer 11 firmly gripping diaphragm 9. The lower face of cylinder 10 has an upwardly extending conical counterbore 20, while the upper face of the bottom wall of casing 6 has a downwardly extending conical counterbore 21. The latter counterbores provide space in which diaphragm 9 may reciprocate in accordance with the variation in pressure in the main distributing tube 8 of the hydraulic brake system.

Cast in insulating block 18 are terminals 22, 23 and 24 which are connected by suitable wires into the control circuits of the stop light and the warning signal as will be explained hereinafter in more detail in connection with Fig. 5. It can be said at this time, however, when electrical connection is established between terminals 22 and 23, which occurs when the brakes are applied, stop light 25 is lit, and when electrical connection is established between terminals 23 and 24, which occurs when the residual pressure in the system falls below normal, warning signal 26 is lit. Washer contact 27 is slidably mounted on stop pin 28, the latter being a continuation of lead-in terminal 23. Washer contact 27 is normally held down against shoulder or stop 29 by the pressure of heavy spring 30, the latter also serving to provide electrical connection between said washer contact and terminal 23. Spring 30 is materially stronger than light spring 31, the latter reacting against the bottom of washer contact 27 at its top and at its bottom pressing down on the bottom wall 32 of cylinder 12. Spring 31 establishes electrical connection between cylinder 12 and terminal 23 through the intermediacy of washer contact 27 and spring 30.

Figure 1:
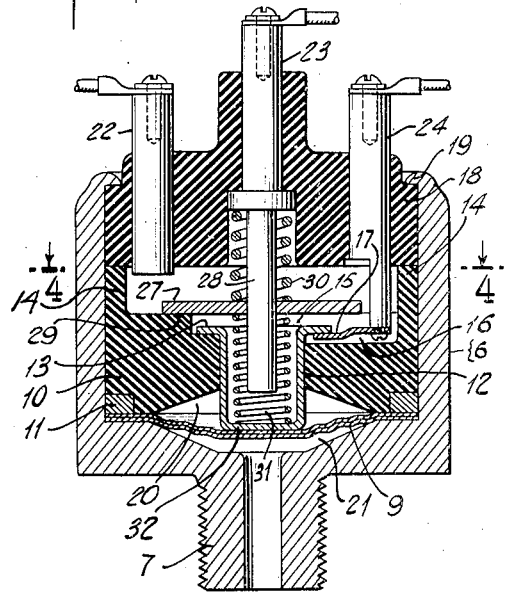
Fig. 1 is a cross section of the switch showing its movable parts in position corresponding to abnormally low pressure in the hydraulic brake system.
Figure 3:
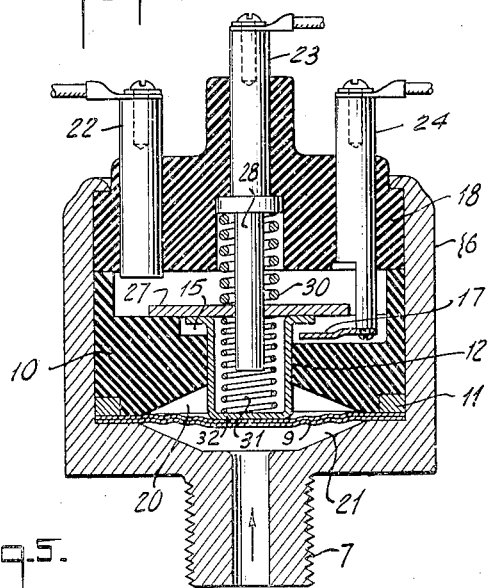
Fig. 3 is a cross section of the switch showing its movable parts in position corresponding to the normal residual pressure that should be present in the system when the brakes are not applied.

The position of the parts shown in Fig. 3 occurs when there is the normal light or residual pressure in the system. At this time washer contact 27 is held down out of contact with selective terminal 22 and against shoulder 29 by spring 30, while cylinder contact 12 is pushed up against the pressure of spring 31 into contact with said washer contact and out of contact with the extension 17 of selective terminal 24. Under these conditions neither the stop light 25 nor the warning signal 26 is lit. The strength of spring 31 is just a trifle under that required to resist normal light pressure. But should there be a leak in the system, the pressure will drop below said normal, allowing spring 31 to push down diaphragm 9, Fig. 1, and with it cylinder 12 so that flange 13 of the latter contacts extension 17 of selective terminal 24, closing the circuit through warning signal 26 as can be seen in Fig. 5. One terminal of warning signal 26 is grounded through wire 33, while its other terminal is then connected to terminal 24 which has extension 17, the latter now being in connection with terminal 23 and source 34 through wire 35. Source 34 is grounded through wires 35 and 36.

Figure 2:
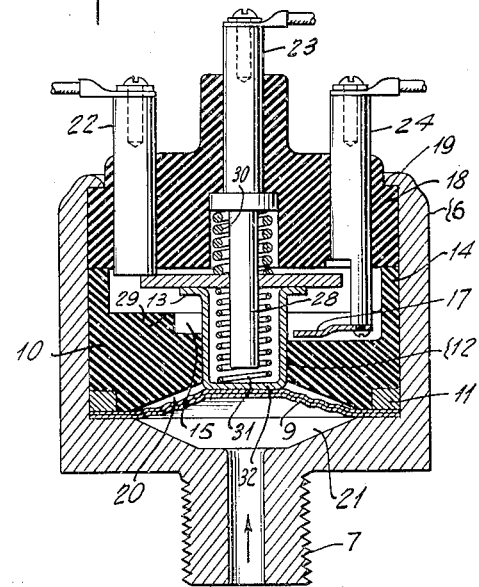
Fig. 2 is a cross section of the switch showing its movable parts in position corresponding to the heavy pressure in the system that occurs when the brakes are applied.
Figure 4:
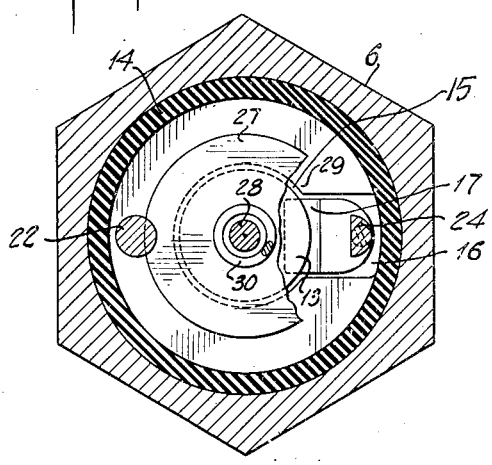
Fig. 4 is a section taken along the line 4—4 of Fig. 1.

The position of the parts shown in Fig. 2 occurs when the brakes are applied causing greatly increased pressure in the brake system. Diaphragm 9 is raised, pushing up contact cylinder 12 against the pressure of spring 31 until the said cylinder reaches washer 27, raising the latter against the pressure of spring 30 until said washer contacts the bottom of selective terminal 22 and closes the circuit through stoplight 25 as can be seen in Fig. 5. One terminal of stoplight 25 is grounded through wire 36, source 34 being grounded through wires 35 and 36, the other terminal of the stop light being connected through wire 38 with terminal 22.

The directions as given herein, such as up or down, or upper or lower, are merely relative for convenience of definition and are therefore not to be considered as absolute.

While the description and drawings relate to a switch for operating a stop light and warning signal, we wish it to be understood that it is not intended to limit the invention to such, but to cover in a broad sense a switch for the operation of a signal when the pressure in the switch is increased beyond a predetermined amount, for the operation of a signal when the pressure falls below a predetermined normal lighter pressure, and to operate no signal when there is said predetermined normal pressure in the switch.

We claim:

1. For use in a hydraulic brake system of a motor vehicle, a pressure operated switch comprising a casing with a passage through it leading to the interior of the casing, a flexible diaphragm inside of the casing extending across the passage for blocking off the flow of the fluid from the hydraulic brake system when the switch is mounted to place said passage in communication with the fluid in said system, a pair of contacts movably mounted in the casing for reciprocating motion with the diaphragm and for motion to and from each other, spring means normally pressing the first of the contacts against the diaphragm and away from the second of the contacts, a second spring means normally pressing the second contact toward the first contact, the second spring means being materially stronger than the first spring means, said contacts adapted to be connected in a circuit and remain connected therein irrespective of their position in the casing, a pair of terminals mounted inside the casing in spaced and insulated relation to each other, the diaphragm holding the first contact between the terminals and out of contact with either when there is a predetermined normal light pressure in the system, and permitting the first spring means to move the first contact against the first of said terminals and away from the second of said terminals when there is less than said normal light pressure, a stop in the casing limiting the motion of the second contact away from the second terminal, the second spring means normally pressing the second contact away from the second terminal and against the stop, the greatly increased pressure in the system when the brakes are applied, pushing the diaphragm against the first contact and in turn pushing the first contact against the second contact, forcing the latter against the second terminal.

2. For use in a hydraulic brake system of a motor vehicle, a pressure operated switch comprising a casing with a passage through it leading to the interior of the casing, a flexible diaphragm inside of the casing extending across the passage for blocking off the flow of the fluid from the hydraulic brake system when the switch is mounted to place said passage in communication with the fluid in said system, three terminals mounted in the casing in insulative relation to each other, a pair of contacts movable axially in the casing and always in electrical connection with one of said terminals, the other two terminals extending into the casing a different axial distance from each other, spring means between the first and second of said contacts urging them apart, a second spring means of materially greater strength than the first spring means, said second spring means normally holding the second contact away from the terminal extending the lesser axial distance into the casing, a stop limiting the motion of the second contact away from said latter terminal and preventing it from contacting the terminal extending the greater distance into the casing, the first contact being mounted in the casing at a greater distance from the lesser extending terminal than the second contact, the diaphragm holding the first contact between the said two terminals and out of contact with either when there is a predetermined normal light pressure in the system, and permitting the first spring means to move the first contact against the greater extending terminal when there is less than said normal light pressure, the greatly increased pressure in the system when the brakes are applied causing the diaphragm to force the first contact with sufficient force against the second contact, to force the latter against the lesser extending terminal.

3. For use in a hydraulic brake system of a motor vehicle, a pressure operated switch comprising a casing with a passage through it leading to the interior of the casing, a flexible diaphragm inside of the casing extending across the passage for blocking off the flow of the fluid from the hydraulic brake system when the switch is mounted to place the passage in communication with the fluid in said system, a pair of terminals mounted in the casing in insulative relation to each other, a pair of contacts mounted for axial motion in the casing, a spring normally pressing the second of said contacts toward the diaphragm and away from the second of said terminals, a stop in the housing limiting the motion of said second contact away from said second terminal, a second spring normally pressing the first contact away from the second contact and toward the diaphragm, the first spring being of materially greater strength than the second spring and normally holding the second contact against said stop away from both terminals, the diaphragm, when there is predetermined normal light pressure in the system, forcing the first contact out of contact with both terminals and against the second contact, overcoming the resistance of the second spring, said first spring being strong enough when there is said normal light pressure to maintain the second contact against the stop, the second spring forcing the first contact against the first terminal when there is less than said normal pressure, the greatly increased pressure in the system when the brakes are applied causing the diaphragm to force the first contact with sufficient force against the second contact to force the latter against the second terminal.

4. For use in a hydraulic brake system, a pressure operated switch, an inlet connection on the switch for mounting the latter in the brake system to have its interior subject to the pressure in the system, a pair of terminals extending into the interior of the switch and mounted therein in insulative relation to each other, a pair of contacts mounted in the interior of the switch to move to and from each other and the terminals, said contacts adapted to be connected in a circuit and remain therein irrespective of their position in the switch, each contact being movable into engagement with one of said terminals, a member movably mounted in the switch subject to the pressure in the system and moved in accordance therewith for moving said contacts in accordance with the pressure in the system, a relatively light spring and a materially heavier spring engaging the contacts, said springs resisting movement of the contacts effected by said movable member as induced by the pressure in the system, the light spring being mounted in relation to the contacts yieldingly to resist their motion toward each other and to effect the movement of one of the contacts into contact with one of the terminals when said movable member is held against said one contact as induced by less than a predetermined light pressure in the system, a stop inside of the switch limiting the motion of the other contact away from the other terminal, the heavy spring normally holding the second contact away from the second terminal against said stop when said member exerts a force as induced by less than a predetermined heavy pressure in the system, the normal light pressure through the intermediacy of said member holding the first contact against the second contact against the resistance of the light spring and away from the first terminal and permitting the second contact to remain against its stop, the first contact forcing the second contact into contact with the second terminal, when moved by said member, against the pressure of the heavy spring when there is at least said predetermined heavy pressure in the system.

5. For use in a hydraulic brake system, a pressure operated switch comprising a casing, an inlet connection on the casing for mounting the switch in the brake system to have its interior subject to the pressure in the system, a flexible diaphragm inside the casing for receiving the pressure of fluid entering the casing through the inlet connection, a lead-in terminal and a pair of selective terminals mounted in the casing in insulative relation to each other, the first of the selective terminals being located in the casing below the second of said terminals, a pair of contacts mounted in the interior of the casing one above the other to move to and from each other and to and from the selective terminals, the lower contact being movable down into engagement with the first selective terminal, the upper contact being movable up into engagement with the second selective terminal, said contacts being in electrical connection with the lead-in terminal irrespective of their position in the casing, a relatively light spring urging the contacts apart and urging the lower contact to react downwardly against the diaphragm and to move toward the first selective terminal, and a relatively heavy spring reacting downwardly on the upper contact urging it toward the lower contact against the pressure of the light spring, and a stop in the casing limiting the downward movement of the upper contact, the lower contact, at a predetermined light pressure in the casing, being held by the diaphragm against the upper contact and the latter against the stop by the heavy spring, the lower contact being forced up by the diaphragm against the upper contact and forcing the latter up against the pressure of the heavy spring into contact with the second selective terminal when at least a predetermined heavy pressure is introduced into the casing.

6. For use in a hydraulic brake system, a pressure operated switch comprising a casing, an inlet connection on the casing for mounting the switch in the brake system to have its interior subject to the pressure in the system, a flexible diaphragm inside the casing for receiving the pressure of fluid entering the casing through the inlet, a cover for the top of the casing of insulating material, a lead-in terminal and a pair of selective terminals mounted in the cover in insulative relation to each other, all of said terminals extending down into the inside of the casing, the first of the selective terminals extending down into the casing a greater distance than the second of the terminals, the lead-in terminal being set between the selective terminals, a pair of contacts movably mounted one above the other inside the casing on the lead-in terminal to move to and from each other and to and from the selective terminals, the lower contact being movable down into engagement with the first selective terminal, the upper contact being movable up into engagement with the second selective terminal, said contacts being in electrical connection with the lead-in terminal irrespective of their position in the casing, a relatively light spring urging the contacts apart and urging the lower contact to react downwardly against the diaphragm and to move toward the first selective terminal, and a relatively heavy spring reacting downwardly on the upper contact urging it toward the lower contact against the pressure of the light spring, and a stop in the casing limiting the downward movement of the upper contact, both contacts being held out of contact with the selective terminals at a predetermined light pressure in the casing with the lower contact being held by the diaphragm against the upper contact and the latter against the stop by the heavy spring, the lower contact being forced up by the diaphragm against the upper contact and forcing the latter up against the pressure of the heavy spring into contact with the second selective terminal when at least a predetermined heavy pressure is introduced into the casing.

7. A pressure operated switch as claimed in claim 5 in which the lead-in terminal extends down into the interior of the casing and is located laterally between the selective terminals, the upper contact being in the form of a disc slidably mounted on the lead-in terminal, the heavy spring being set around said terminal above the upper contact.

8. A pressure operated switch as claimed in claim 5 in which the lead-in terminal extends down into the interior of the casing and is located laterally between the selective terminals, the lower contact being in the form of a sleeve mounted on the lower portion of the lead-in terminal, said sleeve being open at the top and closed at the bottom, the light spring being set around the lead-in terminal, reacting at its top against the upper contact and at its bottom against the closed bottom of the sleeve.

9. For use in a hydraulic brake system having normal light pressure in the system and less than said normal pressure upon failure of the system, and relatively high pressure when the brakes are applied, a pressure operated switch adapted for mounting to have its interior subject to the pressure in said system, a pair of terminals mounted in the switch in insulative relation to each other, a member movably mounted in the switch subject to the pressure in the system and moved in accordance therewith, contact means movably mounted in the switch for contacting the terminals and closing circuits through one terminal or the other in accordance with the position into which it is moved by said member, a relatively light spring and a materially heavy spring engaging the contact means, said springs offering resistance to the movement of the contact means induced by the pressure in the system through the intermediacy of said member, said light spring being of such strength to permit the contact means to be held by said member out of contact with the terminals when there is normal light pressure in the system and to effect contact of the contact means with one of the terminals when said movable member is held against the contact means by less than normal pressure in the system, the heavy spring being of such strength to hold the contact means out of contact with the other terminal when said movable member is held against the contact means by normal light pressure or less and to permit contact of the contact means with said other terminal when the movable member is held against the contact means by said high pressure.

10. For use in a hydraulic brake system having normal light pressure in the system and less than said normal pressure upon failure of the system, and relatively high pressure when the brakes are applied, a pressure operated switch adapted for mounting to have its interior subject to the pressure in said system, a pair of terminals mounted in the switch in insulative relation to each other, a pair of contacts mounted in the interior of the switch to move to and from each other, each contact movable into engagement with only one of the terminals for closing a circuit through said one terminal, a member movably mounted in the switch subject to the pressure in the system and moved in accordance therewith for moving said contacts in accordance with the pressure in the system, a relatively light spring and a materially heavy spring, said springs resisting the movement of the contacts effected by said movable member as induced by the pressure in the system, the light spring being located with respect to the contacts and terminals to resist the movement of the contacts toward each other and to urge the first of said contacts into contact with the first of said terminals, the light spring having a strength less than required to resist said normal light pressure transmitted to it by said movable member through the intermediacy of the first contact whereby the first contact is kept out of engagement with the first terminal during normal light pressure, the heavy spring being located to urge the second of the contacts away from the second of the terminals and toward the first contact, the heavy spring having a strength materially greater than that required to resist said light normal pressure but less than the said high pressure transmitted to it by said movable means through the intermediacy of both contacts when the brakes are applied, whereby the second contact is moved into engagement with the second terminal during said high pressure and away from the second terminal during normal light pressure or less.

11. For use in a hydraulic brake system, a pressure operated switch, an inlet connection on the switch for mounting the latter in the brake system to have its interior subject to the pressure in said system, a lead-in terminal, and a pair of selective terminals, all of said terminals extending into the interior of the switch and mounted therein in insulative relation to each other, a pair of contacts mounted in the interior of the switch to move to and from each other, said contacts irrespective of their position in the switch being electrically connected to the lead-in terminal, each contact movable into engagement with one of said selective terminals, a member movably mounted in the switch subject to the pressure in the system and moved in accordance therewith for moving said contacts in accordance with the pressure in the system, a relatively light spring and a materially heavier spring engaging the contacts, said springs yieldingly resisting the movement of the contacts effected by said movable member as induced by the pressure in the system, the light spring being mounted in relation to the contacts yieldingly to resist their motion toward each other and to effect the movement of one of the contacts into contact with one of the selective terminals when said movable member is held against said one contact as induced by less than a predetermined light pressure in the system, the heavy spring being mounted in relation to the other contact yieldingly to resist motion of said contact into contact with the other selective terminal, contact with said latter terminal being made only when there is heavy enough pressure in the system due to the application of the brakes, to force said member against said latter contact with sufficient force to overcome the resistance of said heavy spring.

MORRIS KATCHER.
CLYDE R. MAYO.

REFERENCES CITED

The following references are of record in the file of this patent:

UNITED STATES PATENTS

| Number | Name | Date |
|---|---|---|
| 2,332,301 | Cox | Oct. 19, 1943 |
| 2,345,023 | Yarbrough et al. | Mar. 29, 1944 |